United States Patent
Otsubo (10) Patent No.: US 11,161,413 B2
(45) Date of Patent: Nov. 2, 2021

(54) VEHICLE CONTROL DEVICE AND INRUSH CURRENT SUPPRESSION METHOD

(71) Applicant: Mitsubishi Electric Corporation, Tokyo (JP)

(72) Inventor: Michio Otsubo, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 34 days.

(21) Appl. No.: 16/615,450

(22) PCT Filed: Jun. 5, 2017

(86) PCT No.: PCT/JP2017/020877
§ 371 (c)(1),
(2) Date: Nov. 21, 2019

(87) PCT Pub. No.: WO2018/225137
PCT Pub. Date: Dec. 13, 2018

(65) Prior Publication Data
US 2020/0171957 A1 Jun. 4, 2020

(51) Int. Cl.
*B60L 3/00* (2019.01)
*B60L 9/18* (2006.01)
(Continued)

(52) U.S. Cl.
CPC ........ *B60L 3/00* (2013.01); *B60L 9/18* (2013.01); *B61C 3/00* (2013.01); *H02H 9/001* (2013.01)

(58) Field of Classification Search
CPC .... B60L 3/00; B60L 9/18; B61C 3/00; H02H 9/00
See application file for complete search history.

(56) References Cited

U.S. PATENT DOCUMENTS 8,502,409 B2 * 8/2013 Kato .................. B60L 3/0069
307/9.1
9,337,681 B2 * 5/2016 Sugiyama ............ B60L 50/16
(Continued)

FOREIGN PATENT DOCUMENTS

JP  2010035338 A  2/2010
JP  2014103790 A  6/2014

OTHER PUBLICATIONS

Office Action dated Feb. 18, 2020, issued in corresponding Japanese Patent Application No. 2019-523228, 6 pages including 3 pages of English translation.
(Continued)

*Primary Examiner* — Dinh T Le
(74) *Attorney, Agent, or Firm* — Buchanan Ingersoll & Rooney PC (57) ABSTRACT

A vehicle control device includes a power converter that converts supplied direct current power and supplies the converted direct current power to a load device. A first voltage detector detects a first voltage that is a voltage of the power supply line. A second voltage detector detects a second voltage that is a voltage of the power converter on a side where a power supply source is provided. When a first contactor is closed and brought into a state allowing current to flow through the first contactor, if a decreasing amount of the first voltage from a first time ago to a present time is greater than or equal to a first threshold and a decreasing amount of the second voltage from a second time ago to the present time is greater than or equal to a second threshold, a contactor controller opens the first contactor.

10 Claims, 6 Drawing Sheets

(51) Int. Cl.
  *B61C 3/00* (2006.01)
  *H02H 9/00* (2006.01)

(56) References Cited

U.S. PATENT DOCUMENTS

| | | | |
|---|---|---|---|
| 10,742,023 B2 * | 8/2020 | Sakurai | F24F 11/62 |
| 2005/0014602 A1 * | 1/2005 | Hara | B60W 20/00 477/3 |

OTHER PUBLICATIONS

International Search Report (PCT/ISA/210) dated Aug. 22, 2017, by the Japan Patent Office as the International Searching Authority for International Application No. PCT/JP2017/020877.

* cited by examiner

VEHICLE CONTROL DEVICE AND INRUSH CURRENT SUPPRESSION METHOD

TECHNICAL FIELD

The present disclosure relates to a vehicle control device to be mounted on an electric railway vehicle and an inrush current suppression method.

BACKGROUND ART

In a case in which an electric railway vehicle enters a dead section, power to a vehicle control device that is mounted on the electric railway vehicle ceases to be provided when a power collection device becomes separated from a power supply line such as an overhead line or a third rail. Thereafter, when, for example, the electric railway vehicle enters an electrified section or the power collection device is brought into contact with the power supply line, a sudden change in the input voltage of the vehicle control device may cause an inrush of current into, for example, a main circuit of the vehicle control device or an electric motor.

An electric vehicle control device disclosed in Patent Literature 1 makes a determination that power is not being supplied from an overhead line when a voltage value of a filter capacitor is less than or equal to a threshold, and then opens a circuit breaker. By opening the circuit breaker and separating the electric vehicle control vehicle from the overhead line, any inrush of current into the main circuit of the vehicle control device or electric motor is suppressed when, for example, the electric railway vehicle enters the electrified section or a power collection device comes into contact with a power supply line.

CITATION LIST

Patent Literature

Patent Literature 1: Unexamined Japanese Patent Application Kokai Publication No. 2010-35338

SUMMARY OF INVENTION

Technical Problem

Voltage of a filter capacitor may oscillate due to an external disturbance caused by mechanical vibration of the electric railway vehicle. The electric vehicle control device disclosed in Patent Literature 1 may make an erroneous determination that power is not being supplied from the overhead line when voltage of the filter capacitor oscillates. Such a situation is problematic in that the electric vehicle control device separates from overhead line even though power is being supplied from the overhead line, thereby preventing power from being supplied to a load device.

In consideration of the aforementioned circumstances, an objective of the present disclosure is to improve accuracy of inrush current suppression processing.

Solution to Problem

In order to achieve the aforementioned objective, a vehicle control device of the present disclosure includes a power converter, a first voltage detector, a second voltage detector, and a contactor controller. The power converter converts direct current power supplied from a power supply source via a power supply line connected to the power supply source and a first contactor or a resistor provided in parallel to the first contactor, and supplies the converted direct current power to a load device. The first voltage detector detects a first voltage that is a voltage of the power supply line. The second detector detects a second voltage that is a voltage of the power converter on a side where the power supply source is provided. The contactor controller closes or opens, based on the first voltage and the second voltage, (i) the first contactor and (ii) a second contactor that is provided at a position for connecting in parallel to the first contactor and connecting in series to the resistor or at a position that is closer to the power converter than the first contactor and the resistor for connecting in series to the first contactor and the resistor. When the first contactor is closed and brought into a state allowing current to flow through the first contactor, if a decreasing amount of the first voltage from a first time ago to a present time is greater than or equal to a first threshold and a decreasing amount of a second voltage from a second time ago to the present time is greater than or equal to a second threshold, the contactor controller opens the first contactor. After the first contactor is opened, if the second contactor is open, the contactor controller closes the second contactor with the first contactor in the opened state, and if the second contactor is closed, the contactor controller keeps the second contactor in the closed state with the first contactor in the opened state.

Advantageous Effects of Invention

According to the present disclosure, the accuracy of the inrush current suppression processing can be improved by opening the first contactor in the case in which the decreasing amount of the first voltage from the first time ago to the present time is greater than or equal to the first threshold and the decreasing amount of the second voltage from the second time ago to the present time is greater than or equal to the second threshold.

DESCRIPTION OF EMBODIMENTS

An embodiment of the present disclosure is described below in detail with reference to the drawings. In the drawings, components that are the same or equivalent are assigned the same reference signs.

Figure 1:
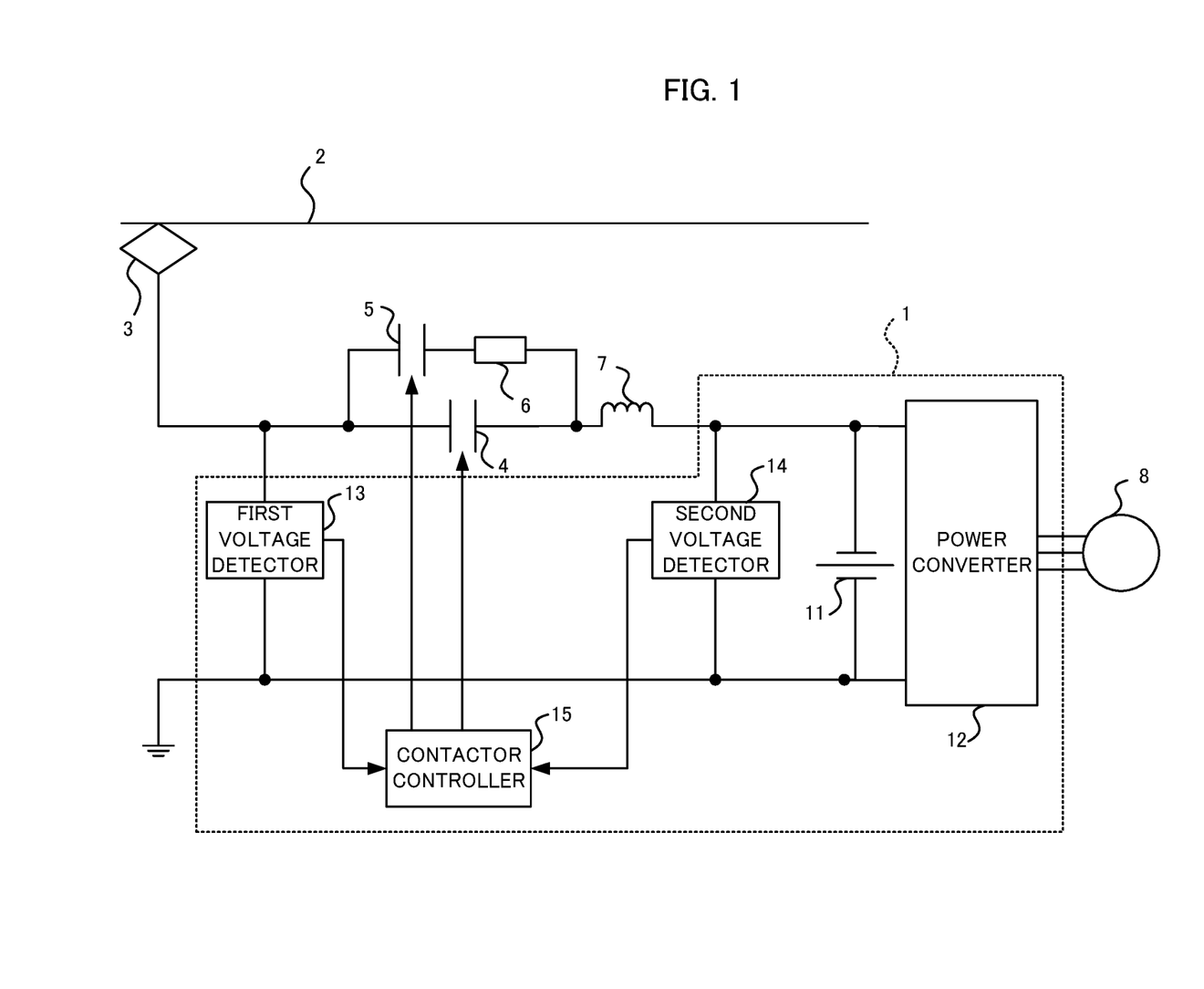
FIG. 1 is a block diagram illustrating a configuration example of a vehicle control device according to an embodiment of the present disclosure.

FIG. 1 is a block diagram illustrating a configuration example of a vehicle control device according to an embodiment of the present disclosure. A vehicle control device 1 includes a filter capacitor 11 and a power converter 12 having a primary-side positive terminal and primary-side negative terminal connected to both ends of the filter capacitor 11. The power converter 12 converts supplied direct current (DC) power to a load device. The power converter 12 is, for example, a variable voltage variable frequency (VVVF) inverter. The power converter 12 converts the supplied power and supplies the converted power to the load device through control by a non-illustrated power converter controller controlling the on/off of a switching element included in the power converter 12. The power converter 12 may perform bidirectional power conversion.

The vehicle control device 1 is mounted on an electric railway vehicle. In the example of FIG. 1, in a case in which a first contactor 4 is closed and a second contactor 5 is open, the vehicle control device 1 is supplied with DC power from a non-illustrated power supply source via an overhead line 2, a power collection device 3, the first contactor 4, and a filter reactor 7. The power collection device 3 is, for example, a pantograph. The power supply line that is connected to the power supply source is not limited to the overhead line 2. The power source line may be, for example, a third rail. In a case in which power is collected from the third rail, the power collection device 3 is a contact shoe. In the example of FIG. 1, the second contactor 5 and a resistor 6 are connected in parallel to the first contactor 4. The second contactor 5 and the resistor 6 are connected together in series. In a case in which the second resistor 5 is closed with the first contactor 4 in an opened state, the vehicle control device 1 is supplied with DC power from the power supply source via the overhead line 2, the power collection device 3, the second contactor 5, the resistor 6, and the filter reactor 7. The second contactor 5 and the resistor 6, as described further below, are provided for suppressing the occurrence of inrush current that occurs when the power converter 12 becomes electrically connected to the power supply source. In the example of FIG. 1, the power converter 12 included in the vehicle control device 1 supplies power to an electric motor 8 that is the load device.

The vehicle control device 1 further includes a first voltage detector 13 that detects a first voltage that is the voltage of the power supply line, a second voltage detector 14 that detects a second voltage that is a voltage of the power converter 12 on a side where the power supply source is provided, and a contactor controller 15 that closes or opens the first contactor 4 and the second contactor 5 based on the first voltage and the second voltage. In the example of FIG. 1, the first voltage detector 13 detects an overhead line voltage that is the voltage on the power supply source side of the first contactor 4. Also, the second voltage detector 14 detects a voltage between both ends of the filter capacitor 11. When the first contactor 4 is closed and brought into a state allowing current to flow through the first contactor 4, if a decreasing amount of the first voltage from a first time ago to a present time is greater than or equal to a first threshold and a decreasing amount of a second voltage from a second time ago to the present time is greater than or equal to a second threshold, the contactor controller 15 opens the first contactor 4. The decreasing amount of the first voltage is a value obtained by subtracting the first voltage at the present time from the first voltage at the first time ago. The decreasing amount of the second voltage is a value obtained by subtracting the second voltage at the present time from the second voltage at the second time ago. The duration of the first time may be the same as the duration of the second time or may be different from the duration of the second time. The first time and the second time each range in duration, for example, from tens of milliseconds to several hundred milliseconds. The first threshold and the second threshold may be the same or may be different from each other. The first threshold and the second threshold each range in duration, for example, from tens of Volts to several hundred Volts.

For example, during normal operation of the electric railway vehicle, the first contactor 4 is closed and the second contactor 5 is open. In such a case, when the electric railway vehicle mounted with the vehicle control device 1 according to the embodiment enters a dead section, the first contactor 4 is opened thereby electrically separating the power converter 12 from the overhead line 2. Thereafter, since the power converter 12 is electrically separated from the overhead line 2 when the electric railway vehicle enters an electrified section, an occurrence of inrush current into, for example, the power converter 12 and the electric motor 8, is suppressed. Since the first contactor 4 is opened or closed based on both the first voltage and the second voltage, accuracy of inrush current suppression processing is improved.

Figure 2:
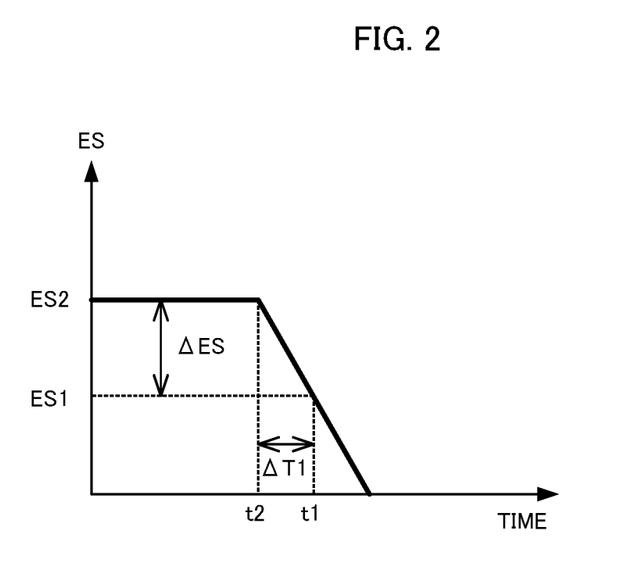
FIG. 2 is a diagram illustrating an example of a change in a first voltage according to the embodiment.
Figure 3:
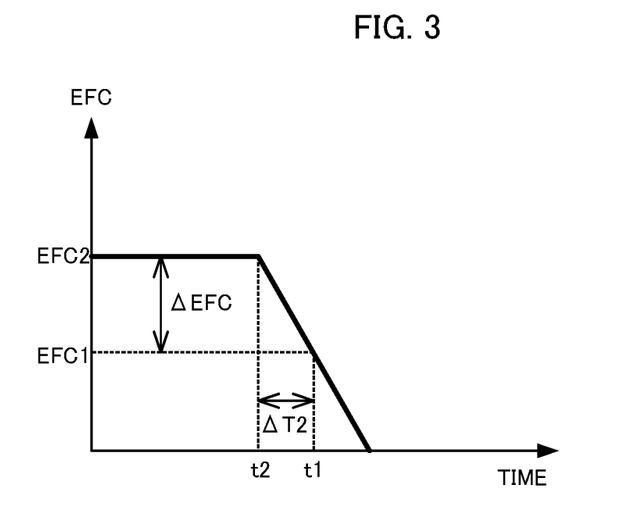
FIG. 3 is a diagram illustrating an example of a change in a second voltage according to the embodiment.

FIG. 2 is a diagram illustrating an example of a change in a first voltage according to the embodiment. Time is on the horizontal axis and a first voltage ES is on the vertical axis. FIG. 3 is a diagram illustrating an example of a change in a second voltage according to the embodiment. Time is on the horizontal axis and a second voltage EFC is on the vertical axis. In FIG. 2 and FIG. 3, the present time is t1. In the examples of FIG. 2 and FIG. 3, the first time duration $\Delta T1$ and the second time duration $\Delta T2$ are the same. The first voltage ES at the present time is ES1 and the first voltage ES at the first time ago is ES2. Therefore, the decreasing amount $\Delta ES$ of the first voltage ES from the first time ago to the present time is ES2−ES1. Also, the second voltage EFC at the present time is EFC1 and the second voltage EFC at the second time ago is EFC2. Therefore, the decreasing amount $\Delta EFC$ of the second voltage EFC from the second time ago to the present time is EFC2−EFC1. The contactor controller 15 opens the first contactor 4 when the decreasing amount $\Delta ES$ of the first voltage ES is greater than or equal to a first threshold Th1 and the decreasing amount $\Delta EFC$ of the second voltage EFC is greater than or equal to a second threshold Th2.

After the first contactor 4 is opened, if the second contactor 5 is open, the contactor controller 15 closes the second contactor 5 with the first contactor 4 in the opened state, and if the second contactor 5 is closed, the contactor controller 15 keeps the second contactor 5 in the closed state with the first contactor 4 in the opened state. While the first contactor 4 is in the opened state and the second contactor 5 is in the closed state, the power collected by the power collection device 3 is supplied to the vehicle control device 1 via the second contactor 5, the resistor 6, and the filter reactor 7. By supplying power to the vehicle control device 1 through the resistor 6, the occurrence of inrush current into, for example, the power converter 12 and the electric motor 8 can be suppressed when the power converter 12 becomes electrically connected to the overhead line 2.

After the first contactor 4 is opened, the contactor controller 15 may perform control of the first contactor 4 and the second contactor 5 based on the first voltage and the second voltage. With the first contactor 4 in the opened state, the first voltage detector 13 detects the first voltage ES at predetermined intervals and the second voltage detector 14 detects the second voltage EFC at predetermined intervals. In a case in which the first voltage ES is greater than or equal to a third threshold Th3 and the value obtained by subtracting the second voltage EFC from the first voltage ES is greater than or equal to a fourth threshold Th4, if the second contactor 5 is open, the contactor controller 15 closes the second contactor 5 with the first contactor 4 in the opened state, and conversely, if, in the same case, the second contactor 5 is closed, the contactor controller 15 keeps the second contactor 5 in the closed state with the first contactor 4 in the opened state. In the state in which the first contactor is open and the second contactor 5 is closed, the vehicle control device 1 is supplied with DC power from the power supply source via the overhead line 2, the power collection device 3, the second contactor 5, the resistor 6, and the filter reactor 7. By supplying power to the vehicle control apparatus 1 via the resistor 6, the occurrence of inrush current into, for example, the power converter 12, the electric motor 8, or the like is suppressed when the power converter 12 becomes electrically connected to the overhead line 2. Thereafter, when the value obtained by subtracting the second voltage EFC from the first voltage ES is less than the fourth threshold Th4, the contactor controller 15 closes the first contactor 4 and then opens the second contactor 5.

The contactor controller 15 may close the first contactor 4 in a case in which the first voltage ES is greater than or equal to the third threshold Th3 and the value obtained by subtracting the second voltage EFC from the first voltage ES is less than the fourth threshold Th4. That is, the first contactor 4 can be closed without closing the second contactor 5 in a case in which the voltage difference between the first value ES and the second voltage EFC is small, to the extent that inrush current does not occur. By closing the first contactor 4 without closing the second contactor 5, the vehicle control device 1 can be supplied with DC power from the power supply source via the overhead line 2, the power collection device 3, the first contactor 4, and the filter reactor 7. The third threshold Th3 and the fourth threshold Th4 are determined in accordance with, for example, a default value of the overhead line voltage, a circuit configuration of the power converter 12, or the like.

Figure 4:
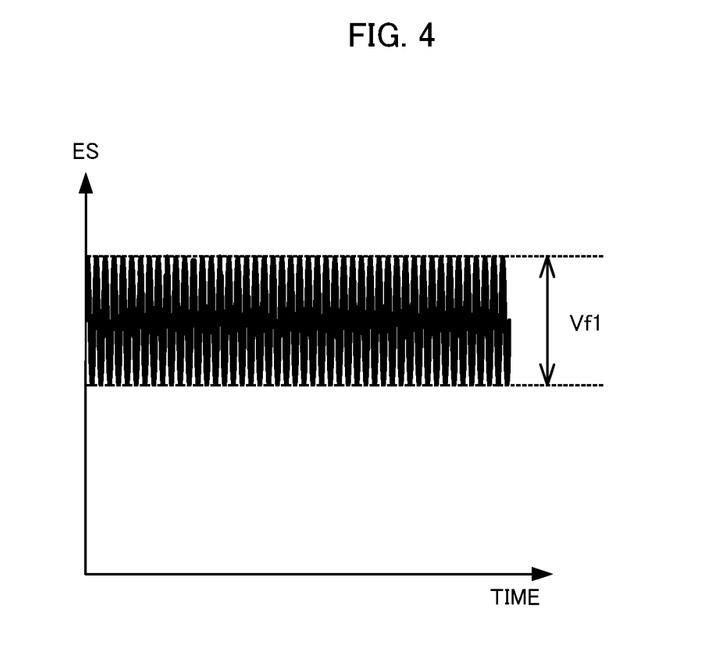
FIG. 4 is a diagram illustrating an example of a fluctuation in the first voltage according to the embodiment.

The first threshold Th1 is greater than the maximum range of fluctuation that occurs in the first voltage ES while, for example, power is supplied by the power supply source at a constant level, the power collection device 3 is in contact with the overhead line 2, and the first contactor 4 is in a closed state. FIG. 4 is a diagram illustrating an example of a fluctuation in the first voltage according to the embodiment. This drawing is viewed in a manner similar to that of FIG. 2. In a case in which the overhead line voltage has noise, the first voltage ES fluctuates as illustrated in FIG. 4. By setting the first threshold Th1 to a value that is greater than the maximum range of fluctuation Vf1 that occurs in the first voltage ES, the accuracy of the inrush current suppression processing can be improved. Vf1 can be determined based on, for example, test runs, simulations, or the like.

Figure 5:
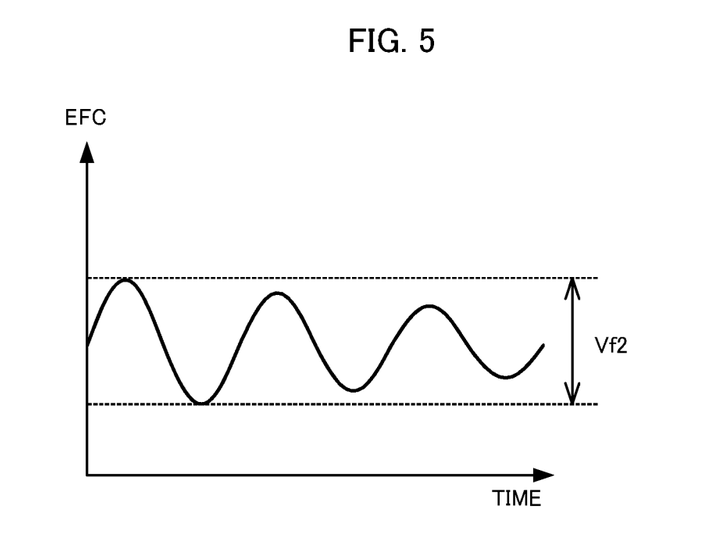
FIG. 5 is a diagram illustrating an example of oscillation of the second voltage according to the embodiment.

The second threshold Th2, is greater than the maximum range of fluctuation that occurs in the second voltage EFC while, for example, power is supplied by the power supply source at a constant level, the power collection device 3 is in contact with the overhead line 2, and the first contactor 4 is in the closed state. FIG. 5 is a diagram illustrating an example of oscillation of the second voltage according to the embodiment. This diagram is viewed in a manner similar to that of FIG. 3. As illustrated in FIG. 5, the voltage of the filter capacitor 11 may oscillate due to an external disturbance caused by mechanical vibration of the electric railway vehicle. By setting the second threshold Th2 to a value that is greater than the maximum range of fluctuation Vf2 that occurs in the second voltage EFC, the accuracy of inrush current suppression processing can be improved. Vf2 can be determined based on, for example, test runs or simulations.

Figure 6:
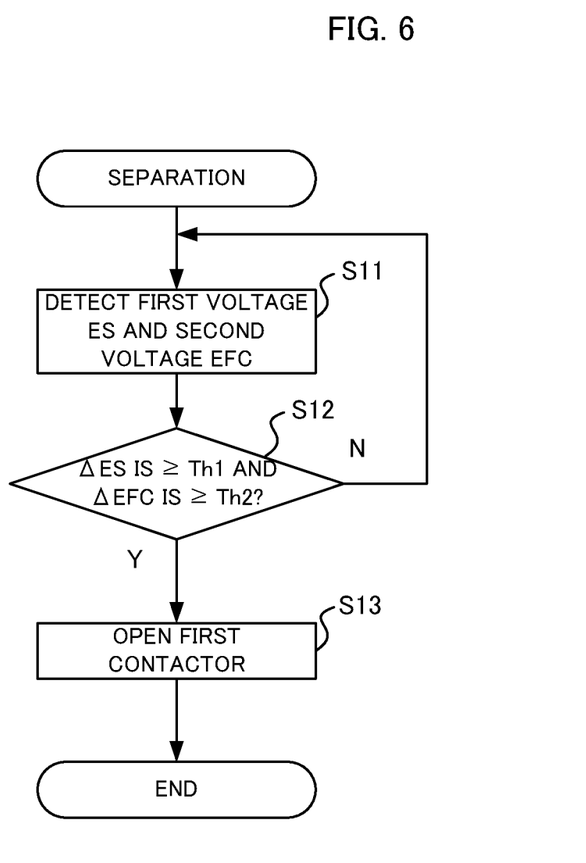
FIG. 6 is a flowchart illustrating one example of separation processing that is performed by the vehicle control device according to the embodiment.

FIG. 6 is a flowchart illustrating one example of separation processing that is performed by the vehicle control device according to the embodiment. FIG. 6 illustrates one example of processing of separation of the power converter 12 from the power supply source. When the first contactor 4 is closed and brought into a state allowing current to flow through the first contactor 4, the first voltage detector 13 detects the first voltage ES and the second voltage detector 14 detects the second voltage EFC (step S11). If the decreasing amount $\Delta ES$ of the first voltage ES in $\Delta T1$ from the first time ago to the present time is greater than or equal to the first threshold Th1 and the decreasing amount $\Delta EFC$ of the second voltage EFC in $\Delta T2$ from the second time ago to the present time is greater than or equal to the second threshold Th2 (YES in step S12), the contactor controller 15 opens the first contactor 4 (step S13). The separation processing ends upon completion of the processing in step S13. If the $\Delta ES$ is less than the first threshold Th1 or the $\Delta EFC$ is less than the second threshold Th2 (NO in step S12), the vehicle control device 1 returns processing to step S11 from where the aforementioned processing is repeated.

Figure 7:
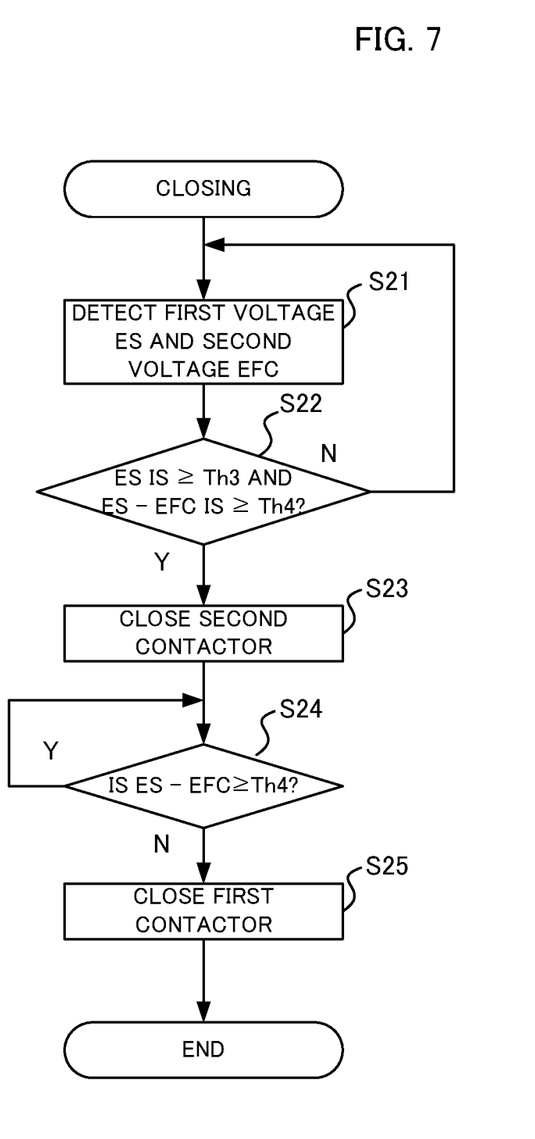
FIG. 7 is a flowchart illustrating one example of closing processing that is performed by the vehicle control device according to the embodiment.

FIG. 7 is a flowchart illustrating one example of closing processing that is performed by the vehicle control device according to the embodiment. FIG. 7 illustrates one example of processing of connecting the power converter 12 to the power supply source. With the first contactor 4 in an opened state, the first voltage detector 13 detects the first voltage ES and the second voltage detector 14 detects the second voltage EFC (step S21). If the first voltage ES is less than the third threshold Th3 or the value obtained by subtracting the second voltage EFC from the first voltage ES is less than the fourth threshold Th4 (NO in step S22), the vehicle control device 1 returns processing to the step S21 where the processing of step S21 is repeated. If the first voltage ES is greater than or equal to the third threshold Th3 and the value obtained by subtracting the second voltage EFC from the first voltage ES is greater than or equal to the fourth threshold Th4 (YES in step S22), the contactor controller 15 closes the second contactor 5 with the first contactor 4 in an opened state (step S23). The processing of step S24 is performed repeatedly for as long as the value obtained by subtracting the second voltage EFC from the first voltage ES is greater than or equal to the fourth threshold Th4 (YES in step S24). When the value obtained by subtracting the second voltage EFC from the first voltage ES is less than the fourth value Th4 (NO in step S24), the contactor controller 15 closes the first contactor 4 (step S25).

The vehicle control device 1 can improve the accuracy of the inrush current suppression processing by performing the separation processing illustrating in FIG. 6 and the closing processing illustrating in FIG. 7.

Figure 8:
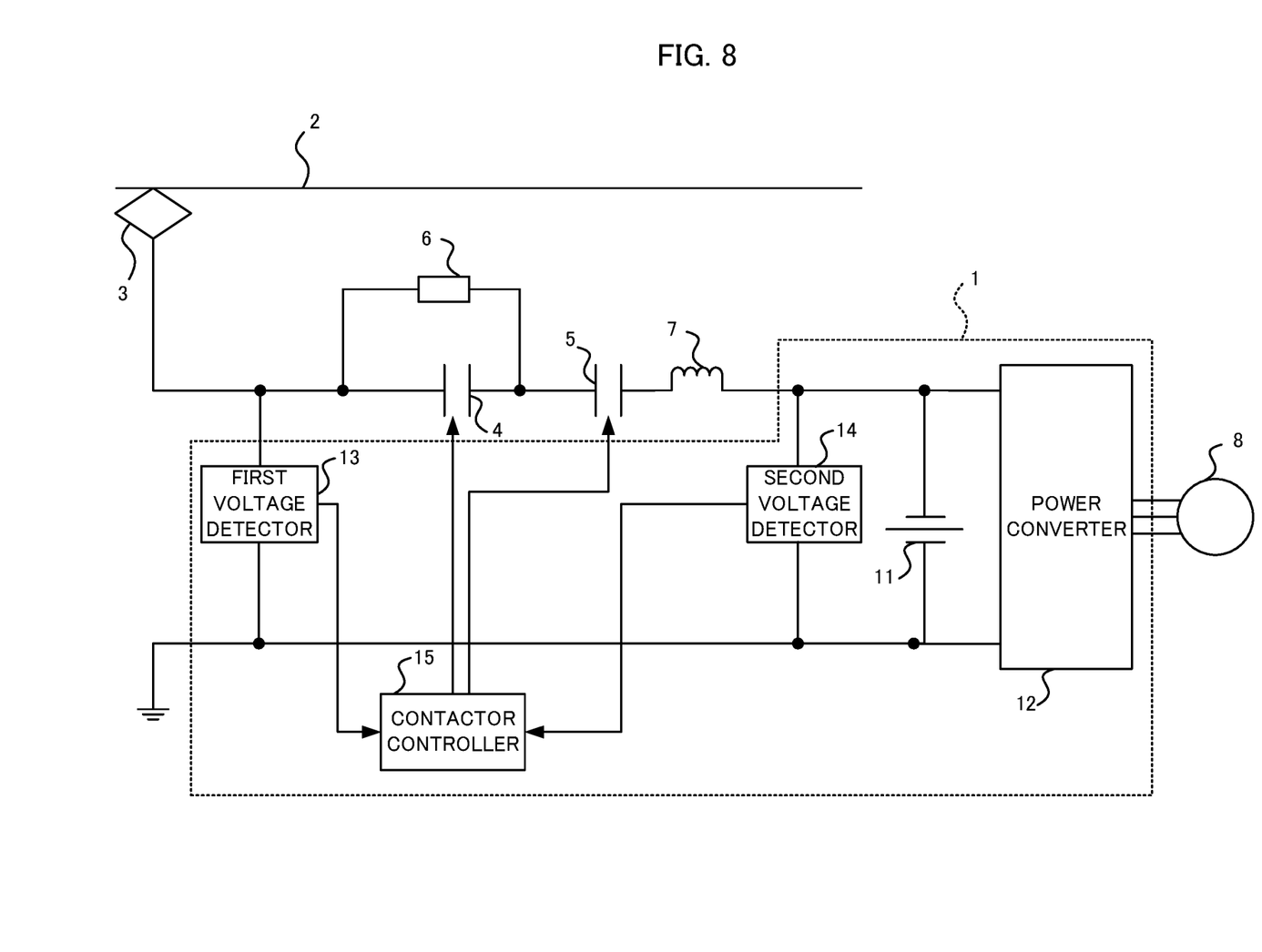
FIG. 8 is a block diagram illustrating another configuration example of the vehicle control device according to the embodiment.

FIG. 8 is a block diagram illustrating the configuration example of the vehicle control device according to the embodiment. The configuration of the vehicle control device 1 is the same as the example of FIG. 1. The arrangement of the first contactor 4 and the second contactor 5 is not limited to the example of FIG. 1. These components may be provided at the positions illustrated in FIG. 8. In the example of FIG. 8, in a case in which the first contactor 4 and the second contactor 5 are both closed, the vehicle control device 1 is supplied with DC power from the power supply source via the overhead line 2, the power collection device 3, the first contactor 4, the second contactor 5, and the filter reactor 7. When the first contactor 4 is closed and brought into a state allowing current to flow through the first contactor 4, if the decreasing amount of the first voltage from the first time ago to the present time is greater than or equal to the first threshold Th1 and the decreasing amount of the second voltage from the second time ago to the present time is greater than or equal to the second threshold Th2, the contactor controller 15 opens both the first contactor 4 and the second contactor 5. In the example of FIG. 8, the state in which the first contactor 4 is closed and current can pass through the first contactor 4 is a state in which both the first contactor 4 and the second contactor 5 are closed. Similar to the aforementioned example, after the first contactor 4 is opened, the contactor controller 15 closes the second contactor 5 with the first contactor 4 in the opened state.

After the first contactor 4 is opened, the contactor controller 15 may perform control of the first contactor 4 and the second contactor 5 based on the first voltage and the second voltage. When the first voltage ES is greater than or equal to the third threshold Th3 and the value obtained by subtracting the second voltage EFC from the first voltage ES is greater than or equal to the fourth threshold Th4 with the first contactor 4 and the second contactor 5 both in the closed state, the contactor controller 15 closes the second contactor 5 with the first contactor 4 in the opened state. By closing the second contactor 5 with the first contactor 4 in the opened state, the vehicle control device 1 can be supplied with DC power from the power supply source via the overhead line 2, the power collection device 3, the resistor 6, the second contactor 5, and the filter reactor 7. By supplying power to the vehicle control device 1 through the resistor 6, the occurrence of inrush current into, for example, the power converter 12 and the electric motor 8 can be suppressed. Thereafter, when the value obtained by subtracting the second voltage EFC from the first voltage ES is less than the fourth threshold Th4, the contactor controller 15 closes the first contactor 4.

In a case in which the first voltage ES is greater than or equal to the third threshold Th3 and the value obtained by subtracting the second voltage EFC from the first voltage ES is less than the fourth threshold Th4, the contactor controller 15 closes both the first contactor 4 and the second contactor 5. By closing both the first contactor 4 and the second contactor 5, the vehicle control device 1 can be supplied with the DC power from the power supply source via the overhead line 2, the power collection device 3, the first contactor 4, the second contactor 5, and the filter reactor 7.

As described above, the vehicle control device 1 of the present embodiment can improve the accuracy of the inrush current suppression processing by opening the first contactor 4 in the case in which the decreasing amount of the first voltage from the first time ago to the present time is greater than or equal to the first threshold and the decreasing amount of the second voltage from the second time ago to the present time is greater than or equal to the second threshold.

The present disclosure is not limited to the embodiment described above. The aforementioned circuit configuration is merely one example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle control device
2 Overhead line
3 Power collection device
4 First contactor
5 Second contactor
6 Resistor
7 Filter reactor
8 Electric motor
11 Filter capacitor
12 Power converter
13 First voltage detector
14 Second voltage detector
15 Contactor controller

The invention claimed is:

1. A vehicle control device comprising:
a power converter to convert direct current power that is supplied from a power supply source via a power supply line connected to the power supply source and a first contactor or a resistor coupled in parallel to the first contactor, and supply the converted direct current power to a load device;
a first voltage detector to detect a first voltage that is a voltage of the power supply line;
a second voltage detector to detect a second voltage that is a voltage of the power converter on a side where the power supply source is provided; and
a contactor controller to close or open, based on the first voltage and the second voltage, (i) the first contactor and (ii) a second contactor, wherein the second contactor is either (a) coupled in parallel to the first contactor and in series to the resistor or (b) coupled in series to the first contactor and the resistor at a position that is closer to the power converter than the first contactor and the resistor,
wherein
in response to the contactor controller determining that, when the first contactor is closed to a closed state thereby permitting current to flow through the first contactor, (a) the first voltage has decreased over an interval from a first time to a present time by an amount greater than or equal to a first threshold value, and (b) the second voltage has decreased over an interval from a second time to the present time by an amount greater than or equal to a second threshold value, the contactor controller opens the first contactor to an opened state, and
in response to the contactor controller determining that, after the first contactor is opened, the second contactor is open, the contactor controller closes the second contactor with the first contactor in the opened state, and
in response to the contactor controller determining that, after the first contactor is opened, the second contactor is closed, the contactor controller keeps the second contactor in the closed state with the first contactor in the opened state.

2. The vehicle control device according to claim 1, wherein after the first contactor is opened, when the first voltage is greater than or equal to a third threshold value, a value obtained by the contactor controller by subtracting the second voltage from the first voltage is greater than or equal to a fourth threshold value, and the second contactor is open, the contactor controller closes the second contactor with the first contactor in the opened state and when the first voltage is greater than or equal to the third threshold value, the value obtained by subtracting the second voltage from the first voltage is greater than or equal to the fourth threshold value, and the second contactor is closed, the contactor controller keeps the second contactor closed with the first contactor in the opened state.

3. The vehicle control device according to claim 1, wherein while power is supplied by the power supply source at a constant level, a power collection device that collects the direct current power from the power supply line is in contact with the power supply line, and the first contactor is in the closed state, the first threshold value is greater than a maximum range of fluctuation that occurs in the first voltage.

4. The vehicle control device according to claim 2, wherein while power is supplied by the power supply source at a constant level, a power collection device that collects the direct current power from the power supply line is in contact with the power supply line, and the first contactor is in the closed state, the first threshold value is greater than a maximum range of fluctuation that occurs in the first voltage.

5. The vehicle control device according to claim 1, wherein while power is supplied by the power supply source at a constant level, a power collection device that collects the direct current power from the power supply line is in contact with the power supply line, and the first contactor is in the closed state, the second threshold value is greater than a maximum range of fluctuation that occurs in the second voltage.

6. The vehicle control device according to claim 2, wherein while power is supplied by the power supply source at a constant level, a power collection device that collects the direct current power from the power supply line is in contact with the power supply line, and the first contactor is in the closed state, the second threshold value is greater than a maximum range of fluctuation that occurs in the second voltage.

7. The vehicle control device according to claim 3, wherein while power is supplied by the power supply source at a constant level, a power collection device that collects the direct current power from the power supply line is in contact with the power supply line, and the first contactor is in the closed state, the second threshold value is greater than a maximum range of fluctuation that occurs in the second voltage.

8. The vehicle control device according to claim 4, wherein while power is supplied by the power supply source at a constant level, a power collection device that collects the direct current power from the power supply line is in contact with the power supply line, and the first contactor is in the closed state, the second threshold value is greater than a maximum range of fluctuation that occurs in the second voltage.

9. An inrush current suppression method to be performed by a vehicle control device that includes a power converter to be supplied with direct current power from a power supply source via a power supply line connected to the power supply source, and a first contactor or a resistor that is coupled in parallel to the first contactor, the inrush current suppression method comprising:

detecting a first voltage that is a voltage of the power supply line;

detecting a second voltage that is a voltage of the power converter on a side where the power supply source is provided;

closing or opening, by a contactor controller, based on the first voltage and the second voltage, (i) the first contactor and (ii) a second contactor, wherein the second contactor is either (a) coupled in parallel to the first contactor and in series to the resistor or (b) coupled in series to the first contactor and the resistor at a position that is closer to the power converter than the first contactor and the resistor;

opening the first contactor to an opened state in response to a determination by the contactor controller that (a) the first voltage has decreased over an interval from a first time to a present time by an amount greater than or equal to a first threshold value, and (b) the second voltage has decreased over an interval from a second time to the present time by an amount greater than or equal to a second threshold value, when the first contactor is closed thereby permitting current to flow through the first contactor; and after the first contactor is opened, closing the second contactor with the first contactor in the opened state in response to a determination by the contactor controller that the second contactor is open, and after the first contactor is opened, keeping the second contactor in the closed state with the first contactor in the opened state in response to a determination by the contact controller that the second contactor is closed.

10. A vehicle control device comprising:

a power converter to convert direct current power that is supplied from a power supply source via a power supply line connected to the power supply source and a first contactor or a resistor coupled in parallel to the first contactor, and supply the converted direct current power to a load device;

a first voltage detector to detect a first voltage that is a voltage of the power supply line;

a second voltage detector to detect a second voltage that is a voltage of the power converter on a side where the power supply source is provided; and a contactor controller to close or open, based on the first voltage and the second voltage, (i) the first contactor and (ii) a second contactor, wherein the second contactor is coupled in series to the first contactor and the resistor at a position that is closer to the power converter than the first contactor and the resistor, wherein in response to the contactor controller determining that, when the first contactor is closed to a closed state thereby permitting current to flow through the first contactor, (a) the first voltage has decreased over an interval from a first time to a present time by an amount greater than or equal to a first threshold value and (b) the second voltage has decreased over an interval from a second time to the present time by an amount greater than or equal to a second threshold value, the contactor controller opens the first contactor to an opened state, and in response to the contactor controller determining that, after the first contactor is opened, the second contactor is open, the contactor controller closes the second contactor with the first contactor in the opened state, and in response to the contactor controller determining that, after the first contactor is opened, the second contactor is closed, the contactor controller keeps the second contactor in the closed state with the first contactor in the opened state.

\* \* \* \* \*